April 7, 1964   W. H. BURNHAM, JR., ETAL   3,127,888
CHARCOAL GRILL HOLDERS
Filed Oct. 5, 1961                2 Sheets-Sheet 2

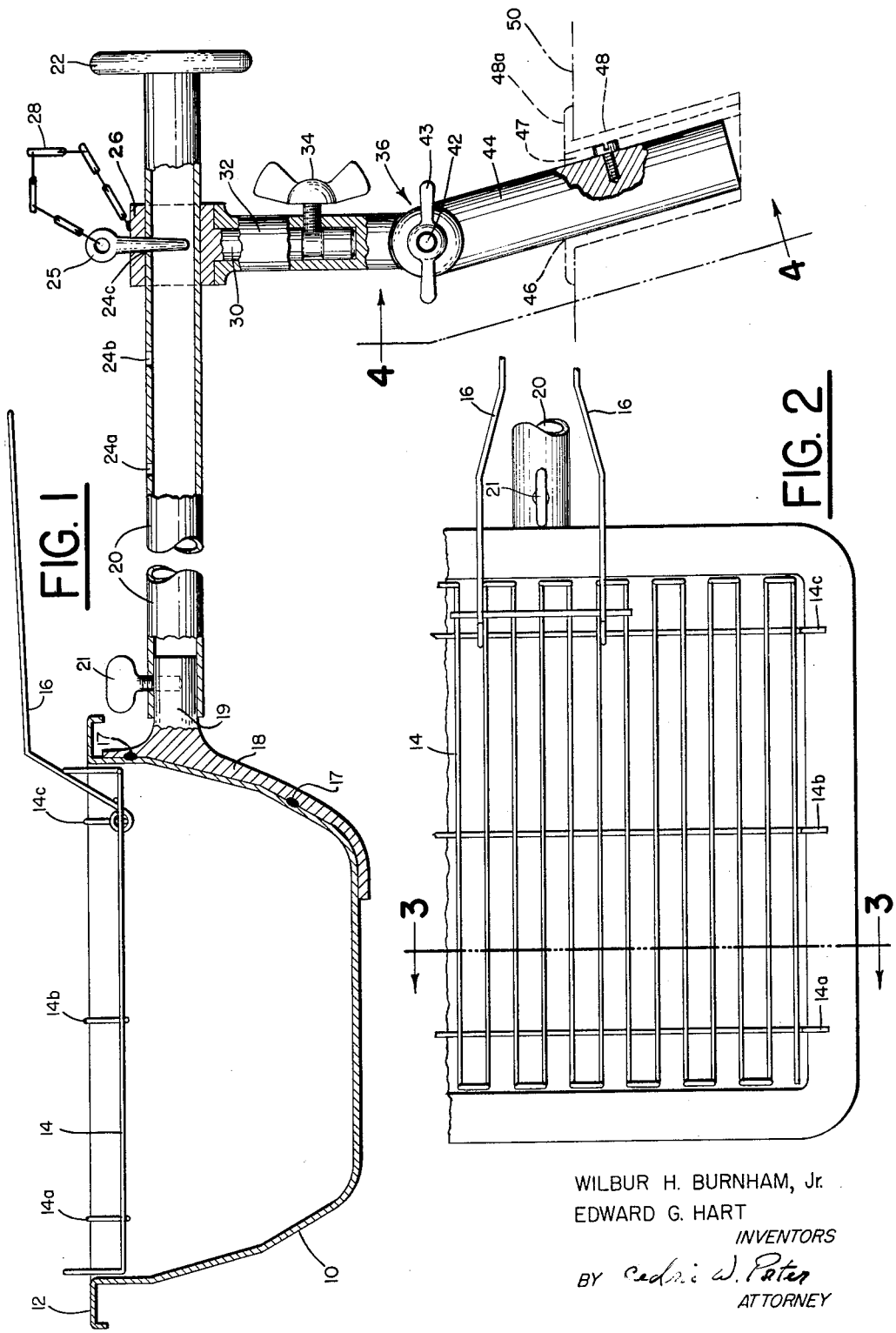

WILBUR H. BURNHAM, Jr.
EDWARD G. HART
INVENTORS
BY Cedric W. Porter
ATTORNEY

United States Patent Office 3,127,888
Patented Apr. 7, 1964

3,127,888
CHARCOAL GRILL HOLDERS
Wilbur H. Burnham, Jr., 167 Sewall Woods Road, Melrose 76, Mass., and Edward G. Hart, 764 Lynnfield St., Lynn, Mass.
Filed Oct. 5, 1961, Ser. No. 143,167
3 Claims. (Cl. 126—25)

Our invention relates to charcoal grill holders and more particularly to a novel charcoal grill holder that is insertable into the common flag socket in the bow or stern of a boat and thereby is capable of suspension over the water allowing "cook-outs" aboard pleasure craft with complete safety from the hazard of fire. Our charcoal grill holder can also easily be adapted for use on land or on boats without flag sockets. Therefore it is a versatile holder for charcoal grills.

Figure 3:
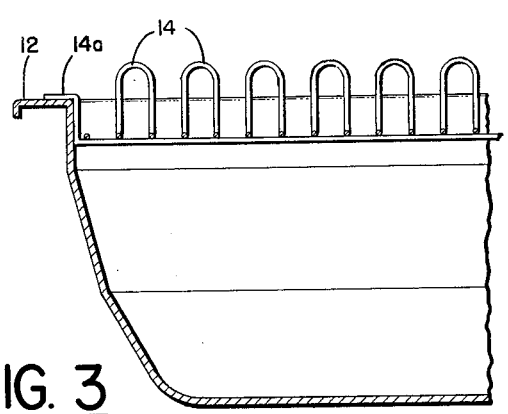

The specific features of our new charcoal grill holder appear evident in the following description and drawings, in which:

FIG. 1 is a side elevation partly in section;
FIG. 2 is a partial plan view;
FIG. 3 is a vertical section along line 3—3 of FIG. 2; and
FIG. 4 is a side elevation of line 4—4 of FIG. 1.

As shown in FIG. 1, our invention consists of a receptacle 10 with flanged edge 12. Receptacle 10 serves as a fire bowl to hold burning charcoal or other suitable fuel. Grid 14 is insertable into receptacle 10 and has transverse rods 14a, b, c that rest upon the upper surface of flange 12, suspending grid 14 in a proper position for cooking above the fuel in receptacle 10. Grid 14 serves as a rack upon which food to be cooked is placed. Handle 16 is secured to grid 14 enabling the operator to easily remove grid 14 from receptacle 10 for such purposes as dumping ashes, building a fire, adding fuel or to remove cooked food for serving. Handle 16 is of an elongated heavy gauge wire construction to facilitate rapid cooling to prevent the operator from being burned when he grasps handle 16 to remove grid 14 from the grill when it is in operation.

Shaft 20 distally extends from the outer edge of receptacle 10 and includes bracket or plate 18 fixed to receptacle 10 in any suitable manner as by spotwelding as shown at 17 or by rivets or bolts. Bracket 18 in turn has a stub arm 19, to which shaft 20 is detachably attached, as by means of set screw 21, which inserts in a suitable threaded socket in arm 19. Shaft 20, preferably round in shape, but not necessarily of tubular construction, has secured to the distal end thereof the handle or knob 22. Knob 22 is utilized as a means of turning and rotating the grill and shaft upside down so as to empty ashes and hot coals directly into the water and thus eliminate danger of fire on the pleasure craft. A longitudinal series of spaced holes 24a, b and c are provided on the upper surface of shaft 20 and serve to allow the securing pin 25 to be inserted thereinto through a corresponding and matching hole in T or joint 26. Insertion of locking pin 25 through properly aligned holes provides a means of fastening the grill unit in a secure position to eliminate the possibility of tipping and to provide a degree of adjustability in length that the grill unit extends over the stern of the boat. A chain 28 is preferably provided to secure pin 25 to T 26 at all times and to provent locking pin 25 from being misplaced or lost overboard. T 26 carries a downwardly extending stub arm 30 which inserts into the central longitudinal cavity of tubular sleeve 32. Set screw 34, perpendicularly inserted through tube 32 locks sleeve 32 to arm 30 of the T 26, thereby securing the grill unit and preventing rotation. It will be understood that releasing set screw 34 will permit the grill unit to be rotated in a 360° circle in a horizontal plane. This rotation feature permits the grill to be brought over the deck of the boat for such purposes as adding fuel to the grill or for the placing or removal of food from the grill.

Figure 4:
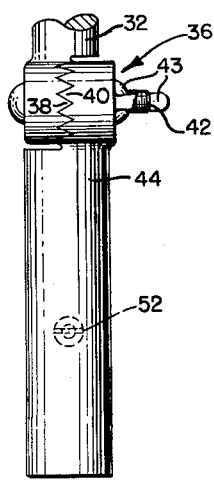

As shown more particularly in FIG. 4, a side elevation of line 4—4 of FIG. 1, a joint assembly 36 is provided having rotatably adjustable interlocking sets of teeth 38 and 40, to be locked by bolt 42, and wing nut 43. Joint assembly 36 includes the downwardly extending shaft 44, designed to be inserted in the flag socket 46 provided in boat deck 50 (FIG. 1). The purpose of this joint assembly is to provide a means to adjust the grill assembly so that it is parallel to the deck 50 by permitting said grill assembly to be locked in a horizontal position, regardless of the angle of inclination of the flag socket 46 referred to below. Teeth 38 and 40 also provide a junction for shafts 32 and 44. The flag socket 46 is customarily lined with a metal sleeve 48 with or without a flange 48a. The lower shaft 44 is preferably prevented from rotation within the flag socket 46 by means of a key 52, herein provided in the form of a screw with head, which it is understood preferably inserts into a vertical keyway 47 provided in sleeve 48. It will thus be understood that means is provided for locking the grill unit in adjustable position, as desired, to meet the variable conditions found in different boats and sizes of boats.

It will thus be seen that we have provided a versatile charcoal grill holder designed to be supported in the flag socket of a boat or the like, in adjustable positions as to length, height and angle of inclination of the supporting socket.

It is obvious that other modifications, variations and adaptations of our device may be provided without departing from our invention as described in the following claims.

We claim:
1. A charcoal grill holder, comprising a bowl-like receptacle for burning coals, a removable grill fitting the top of said receptacle for cooking food thereon, a bracket having a stub arm fixedly attached to said receptacle for supporting the same horizontally, a tubular shaft fitting the end of said stub arm and having means for keying said shaft to said arm, a bearing for adjustably supporting said shaft in a horizontal plane and having a downwardly extending arm, a tubular sleeve fitting said downwardly extending arm, and a shaft hingedly and adjustably connected to said tubular sleeve, said shaft being capable of being supported in a rigid socket.

2. A charcoal grill holder according to claim 1 in which the connection hingedly connecting said shaft to said tubular sleeve includes an adjustable joint and set screw.

3. A charcoal grill holder comprising a bowl-like receptacle for burning coals, a removable grill fitting the top of said receptacle for cooking food thereon, a handle for said grill, a bracket having a stub arm fixedly attached to said receptacle for supporting the same horizontally, a tubular shaft fitting the end of said arm and having means for keying said shaft to said stub arm, a knob on the outer end of said shaft, a bearing for adjustably supporting said shaft in a horizontal plane and having a downwardly extending arm, a tubular sleeve fitting said downwardly extending arm, and a shaft hingedly and adjustably connected to said tubular sleeve, said shaft being capable of being supported in a rigid socket.

References Cited in the file of this patent

UNITED STATES PATENTS

| | | |
|---|---|---|
| 1,823,535 | Frutkow et al. | Sept. 15, 1931 |
| 2,176,252 | Fauata | Oct. 17, 1939 |
| 2,520,412 | Jensen | Aug. 29, 1950 |
| 2,667,392 | Sexton | Jan. 26, 1954 |
| 2,827,846 | Karkling | Mar. 25, 1958 |

FOREIGN PATENTS

| | | |
|---|---|---|
| 62,363 | France | Jan. 12, 1955 |

(1st addition to Patent No. 1,029,257)